US005815067A

United States Patent [19]

Knoble et al.

[11] Patent Number: 5,815,067

[45] Date of Patent: Sep. 29, 1998

[54] SINGLE CONTROL WIRE DEVICE FOR HID DIMMING

[75] Inventors: David W. Knoble, Tupelo; Khosrow Jamasbi, Belden; Robert D. Munson, Tupelo, all of Miss.; James V. Olson, Indianapolis, Ind.

[73] Assignee: Thomas Lighting, Tupelo, Miss.

[21] Appl. No.: 858,508

[22] Filed: May 19, 1997

[51] Int. Cl.[6] .................... H04M 11/04

[52] U.S. Cl. .................... 340/310.01; 340/310.03; 315/137; 315/199; 315/244

[58] Field of Search .................... 340/310.01, 310.03, 340/538, 496, 642; 315/137, 199, 210, 244

[56] References Cited

U.S. PATENT DOCUMENTS

| | | | |
|---|---|---|---|
| 3,265,907 | 8/1966 | Kurata et al. | 327/587 |
| 3,894,265 | 7/1975 | Holmes et al. | 315/137 |
| 3,959,772 | 5/1976 | Wakasa et al. | 340/310.03 |
| 3,999,100 | 12/1976 | Dendy et al. | 315/308 |
| 4,181,873 | 1/1980 | Nuuer | 315/199 |
| 4,207,498 | 6/1980 | Spira et al. | 315/137 |
| 4,277,728 | 7/1981 | Stevens | 315/307 |
| 4,292,633 | 9/1981 | Goodwin, Jr. et al. | 340/310.03 |
| 4,350,935 | 9/1982 | Spira et al. | 315/291 |
| 4,371,812 | 2/1983 | Widmayer | 315/291 |
| 4,392,086 | 7/1983 | Ide et al. | 315/174 |
| 4,395,660 | 7/1983 | Waszkiewicz | 315/291 |
| 4,523,131 | 6/1985 | Zansky | 315/307 |
| 4,529,913 | 7/1985 | Brosillon | 315/224 |
| 4,958,107 | 9/1990 | Mattas et al. | 315/244 |
| 5,227,762 | 7/1993 | Guidette et al. | 340/310.01 |
| 5,327,048 | 7/1994 | Troy | 315/240 |
| 5,412,369 | 5/1995 | Kirchner | 340/310.03 |
| 5,475,360 | 12/1995 | Guidette et al. | 340/310.01 |

*Primary Examiner*—Jeffery A. Hofsass
*Assistant Examiner*—John Tweel, Jr.
*Attorney, Agent, or Firm*—Hill & Simpson

[57] ABSTRACT

A dimming control for a high intensity lighting system uses a single additional control wire for control of the dimming function. The lighting system operates on multi-phase power. A transmitter for transmitting a control signal over the single control wire is connected between two of the phases of the multi-phase power supply, or between one phase and neutral. The transmitter, upon the occurrence of a predetermined condition, transmits a control signal to the single control wire. The control signal is a rectified portion of the power supply. The predetermined condition is motion as sensed by a motion sensor, operation of a timer, or operation of a manual switch. A receiver connected to the control line receives the control signal and switches the light to a low light output mode. The is accomplished by changing the capacitance of the ballast circuit for the light. Each lamp of the lighting system has a receiver connected to the single control wire.

10 Claims, 11 Drawing Sheets

SINGLE CONTROL WIRE DEVICE FOR HID DIMMING

BACKGROUND OF THE INVENTION

1. Field of the Invention

The present invention relates generally to a control in a multi-phase power system and, in particular, to a single wire control for a three phase lighting system.

2. Description of the Related Art

Lighting systems operating on multi-phase power, such as high intensity discharge (HID) lighting, is regularly used in commercial installations, including factories, warehouses and the like. Dimming of the light output from the lights on occasion is highly desirable to decrease energy costs. A control is known for dimming of HID lighting systems which operates via a power line carrier. An example of a power line controlled lighting system is shown in U.S. Pat. No. 5,227,762.

The power line may be sufficiently noisy that the use of a power line carrier is precluded. It is known to incorporate additional wires for control purposes where economically feasible or where the power line is too noisy. Products are currently on the market which utilize dual control wires for dimming of high intensity discharge lamps.

Typical hard wired high intensity discharge dimming systems use two control wires. A constant voltage, which is typically 120 volts AC, is imposed between the two control wires for controlled purposes. The ballast housing has four wires connected thereto, two for power and two for control. Some systems operate only on line voltages which have a neutral wire and utilize the neutral wire as one of the two control leads. When a voltage is applied to the control wire, a switch in the ballast housing activates to cause dimming or brightening of the high intensity discharge lamp. Such systems are restricted to a particular single control voltage.

SUMMARY OF THE INVENTION

An object of the present invention is to provide dimming of high intensity discharge (HID) lighting utilizing only a single control wire.

Another object of the present invention is to provide single wire control of lighting or other electrical systems for both delta and wye power connections.

A further object of the present invention is provide for transmission of slow data in a three-phase power system where the source and destinations for the data may not share a common ground.

Yet another object of the invention is to provide a control in a multi-phase system in which transmitters for transmitting control signals and receivers for receiving the control signals may be on different phases of the multi-phase system or on the same phase.

The present invention provides a single control wire for dimming high intensity discharge lighting in which a transmitter is connected between two phases or between one phase and neutral of the power system and selectively transmits a control signal on the single control wire. A receiver connected to the single control wire and to any two phases or to a phase and neutral receives the control signal and controls the lighting accordingly. The control signal is not restricted to a single or to a particular voltage. The present invention permits fixtures on a three-phase delta or wye power system or a mixture of both to be controlled by an additional single control wire. By utilizing a single control wire, the present invention takes advantage of utilizing an existing neutral wire when the fixtures are wired in a wye system line-to-neutral. New fixtures are wired phase-to-phase. For example, a typical 277 volt AC wiring system is wired line-to-neutral. By replacing the fixtures with 480 volts AC fixtures, the neutral wire is used for control purposes.

Diodes are used in the transmitters to accomplish the single control lead so that the control voltages are the higher of two input power lines. The diodes are used in the receivers so that the current is sunk to the lower of the two input power lines.

The present single wire dimming control may use motion sensors, infrared sensors, manual switches or timers for the control of the dimming. In other words, the transmitters for transmitting the control signal over the control wire may be activated manually, by sensors or by timers. The receivers that effect the control, which is preferably dimming, of the lighting switch in and out capacitors from the ballast circuit of each lamp to dim or brighten the lamp. The receiver circuits may also include programmable processors for a greater range of control functions, such as resetting upon loss of power, control by both automatic and manual means, etc.

The present single wire control is not limited only to dimming of lights or to controlling only lighting systems. The principles of the present invention may be applied to a wide variety of control applications. A multi-phase powered electrical system may, by the addition of one wire, utilize a transmitter to send control signals over the one wire to any number of remote receivers connected to the power system. The receivers may perform control functions relating to the electrical devices connected to the multi-phase system or may control some other device.

DETAILED DESCRIPTION OF THE PREFERRED EMBODIMENTS

Figure 1:
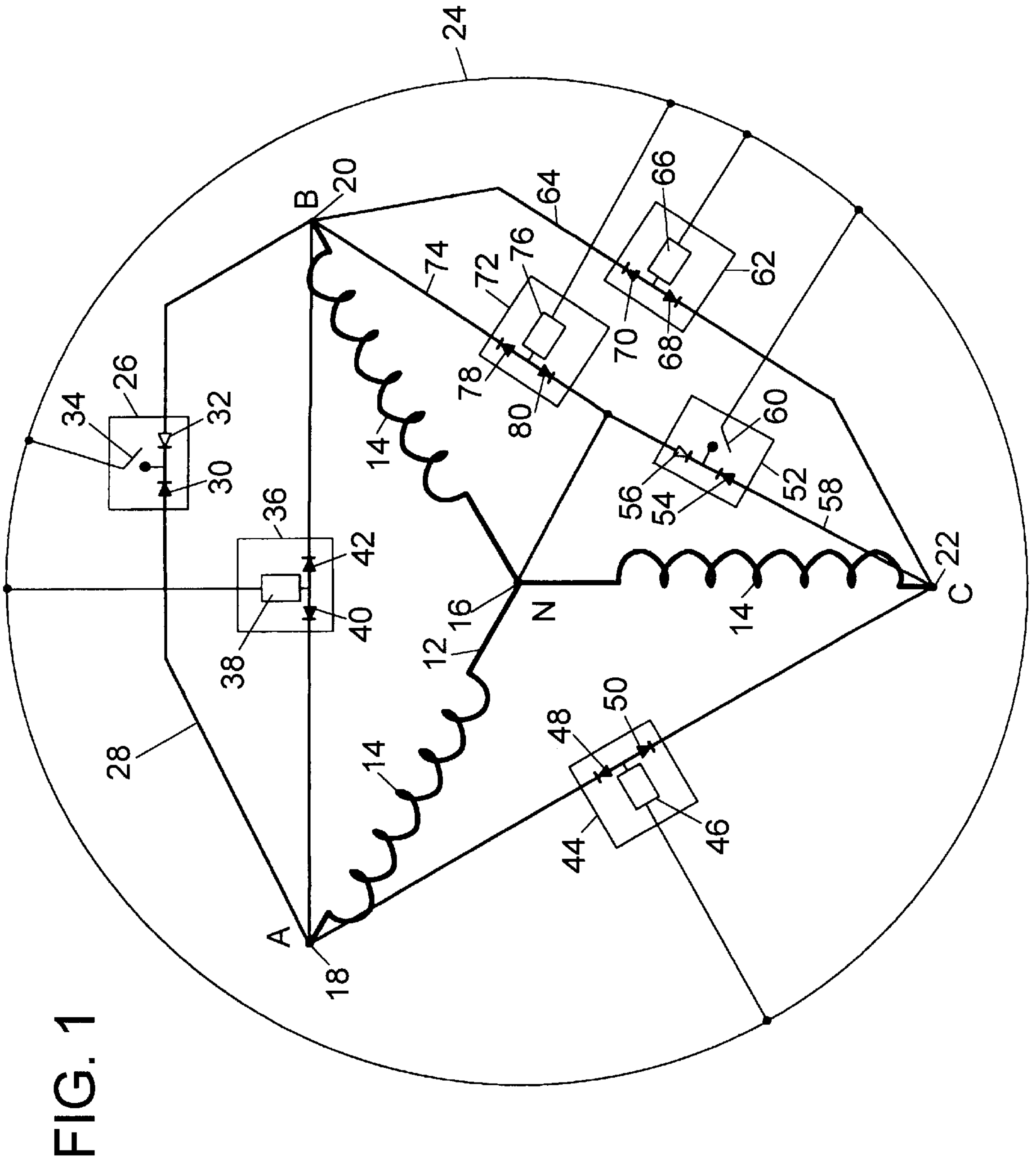
FIG. 1 is an electrical circuit diagram showing the single wire control of the present invention for use in a single-phase delta connection, a multi-phase delta connection, and a multi-phase wye connection.

In FIG. 1 is shown a three phase power system with 12 with transformer coils 14 connected between neutral 16 and phase A 18, phase B 20 and phase C 22. A control wire 24 according to the invention is shown encircling the power system 12. A transmitter 26 for transmitting a control signal over the control wire 24 is connected in a line 28 between phase A 18 and phase B 20. The transmitter 26 includes a pair of diodes 30 and 32 connected with opposite polarity. As an alternative, only one diode may be used in the transmitter 26. Between the diodes 30 and 32 is a switch 34 that selectively connects the voltage on the line 28 to the control line 24. The voltage of the line 28 is impressed upon the control wire 24 by the switch 34 upon the occurrence of a predetermined condition. The predetermined condition may be the presence of a person where the switch 34 is a person sensing apparatus such as an infrared sensor or an ultrasonic sensor which indicates the presence of a person in a facility being illuminated by HID (high intensity discharge) lighting. Alternately, the switch 34 is closed either by manual or automated operation, such as under the control of a timer. When the switch 34 closes, the control line 24 is connected through a diode, either diode 30 or the diode 32 and the line 28 to phase A 18 or phase B 20 for supplying power to the transmitter. Which ever of the phases 18 or 20 is more positive in potential at a given time determines which of the two diodes 30 and 32 is conducting at a given time, which in turn determines whether the control line 24 is at a potential equal to the phase A 18 or the phase B 20. If phase A 18 is higher in potential than phase B 20, then the control line 24 is at the voltage of phase A 18. If, on the other hand, the phase B 20 is at a higher voltage than phase A 18, then the control line 24 is equal to the voltage of phase B 20.

For purposes of the present invention the number of the diodes 30 and 32 is arbitrary. It is within the scope of the present invention that all of the diodes may be reversed. It is the relative number of the diodes which result in the benefits of the present invention.

The control signal from the transmitter 26 is transmitted over the control wire 24 to a receiver 36. The receiver 36 of one embodiment includes a relay coil or other switching means 38 and a pair of diodes 40 and 42 connected with opposite plurality, wherein the polarity of the receiver diodes 40 and 42 is different than the polarity of the transmitter diodes 30 and 32 so that the current may flow through both the transmitter 26 and the receiver 36 via the control line 24. The current flow through the relay coil 38 of the receiver triggers operation of the relay, opening or closing the relay contacts. The relay contacts are connected in a ballast circuit of a high intensity lighting system to switch in and out a parallel connected ballast capacitor, which changes the capacitance of the ballast circuit and results in dimming and brightening of the light, respectively.

The transmitter 26 and the receiver 36 are for use in a same phase control, delta three phase power system. The transmitter 26 and the receiver 36 are in the same phase of the three phase circuit. Other arrangements are also possible, as will be discussed. For example, a multi-phase control delta power system is possible. The multi-phase system uses the transmitter 26 in FIG. 1 and provides a receiver 44 connected between a different phase than the transmitter, being shown here between phase A 18 and phase C 22. The receiver 44 includes a relay coil 46 and a pair of oppositely connected diodes 48 and 50. The single control wire 24 transmits the control signal from the transmitter 26 to the receiver 44, as in the previously described receiver 36. The transmitter 26 and the receiver 44 thus form the multi-phase control delta system.

Another embodiment is shown in FIG. 1, wherein a multi-phase wye system is shown connected between phases B 20 and C 22 in a three phase wye power system. A second transmitter 52 is provided, which includes diodes 54 and 56 connected in a line 58 between phase C 22 and neutral 16. A switch 60 connected the midpoint of the oppositely connected diodes 54 and 56 to the control line 24. The transmitter 52 transmits the higher of the voltage at phase C or neutral 16 to the control line 24 when the switch is closed. Like the transmitter 26, the switch 60 may be a manual switch, a timer operated switch, or a sensor.

As an alternate embodiment, only a single diode is used which is connected to either the power line or the neutral line in the transmitter 52. In the embodiment utilizing a transmitter with a single diode, the receiver produces at least one path through a diode for current flow. The current flow is averaged and does not need to be continuous since half wave ratification is sufficient. In a preferred embodiment, the time constant of averaging is about one second.

A receiver 62 is provided between the phases B 20 and C 22 on line 64. The receiver is constructed of a relay coil 66 and a diode pair 68 and 70 which are connected oppositely to one another and opposite to the diodes of the transmitters. A receiver 72 is connected in the line 74 between phase B 20 and neutral 16, and includes a relay coil 76 connected to the control line 24 and a pair of oppositely connected diodes 78 and 80.

According to the present invention, all of the transmitters and receivers must be on the same distribution transformer even though they can be on different phases.

Figure 2:
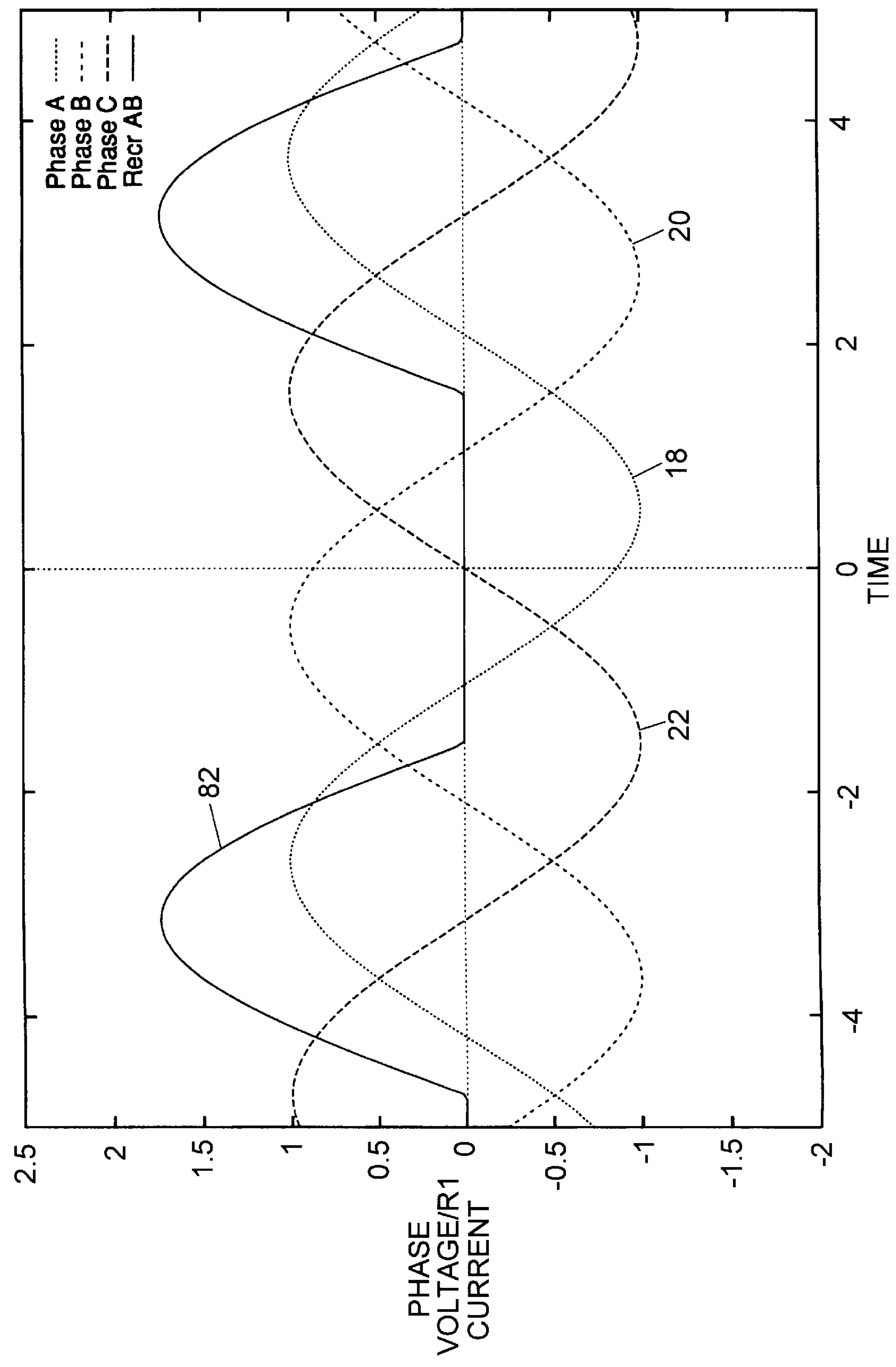
FIG. 2 is a voltage-phase diagram of a control voltage according to the present invention as seen by a receiver on the same phase as the transmitter.

Referring to FIG. 2, when the transmitter 26 connects the control line 24 through the diodes alternately to phase A and B, the receivers accept the control voltage and permit current to flow to that input line which is the more negative potential. With reference to the graph of FIG. 2, the voltage over time of the phase A is shown at 18, while the voltage of phase B is shown at 20 and the voltage of phase C is shown at 22. A voltage 82 is shown as the voltage seen by the receiver 36 when the switch 34 in the transmitter 26 is closed. At the instantaneous time when the phase A 18 is higher in potential than the phase B 20, the diode 30 in the transmitter 26 is conducting and the control line 24 is at the potential of the phase A. The receiver 26 provides a current path from the control line 24 which is at the potential of the phase A 18 to the phase B 20 through the relay 38 and through the diode 24. This control current flows in a single direction due to the diodes in the current path. The result is that the ballast capacitance for a light is changed each time the waveform 82 moves from zero or returns to zero.

FIG. 2 illustrates the control signal seen by a receiver when the transmitter responsible for the control is connected between the same phases.

Figure 3:
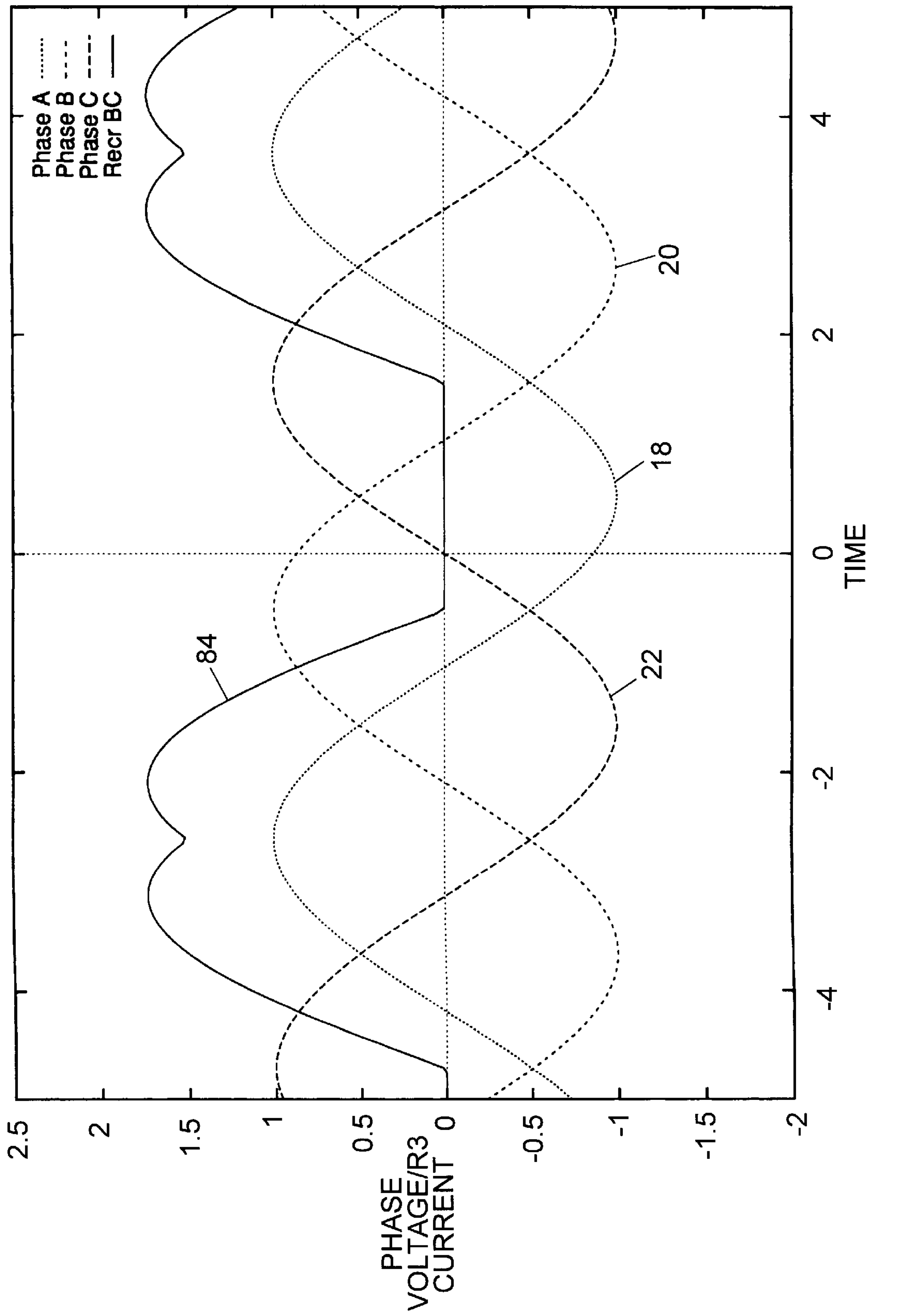
FIG. 3 is a voltage-phase diagram of a control voltage as seen by a receiver on a different phase from the transmitter.

In FIG. 3, the transmitter 26 is transmitting the control signal over the control line 24 to the receiver 44, resulting in the waveform 84. In other words, the control signal illustrated is the signal seen by a receiver connected between a different phase pair than the phase pair of the signal transmitter. The ballast capacitance of a light controlled by the receiver 44 is changed as the waveform 84 moves from zero or returns to zero.

Figure 4:
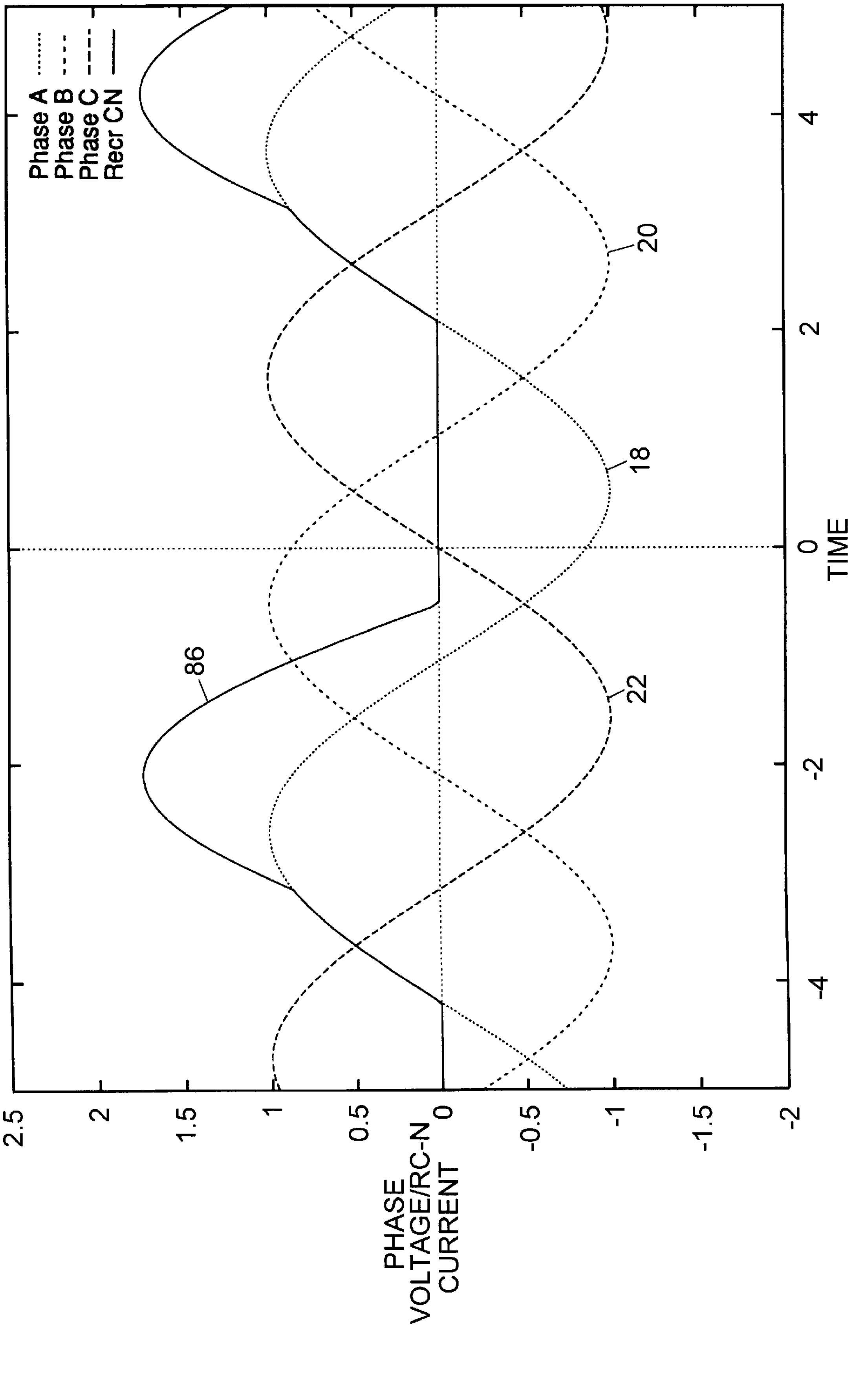
FIG. 4 is a voltage-phase diagram of a control voltage as seen by a receiver connected between a phase and neutral.

FIG. 4 shows a waveform 86 as seen by the receiver 52. This is the waveform seen by a receiver connected between a phase and neutral. The waveform 86 differs in shape from the preceding waveforms, but results in operation of the relay switch nonetheless.

Figure 5:
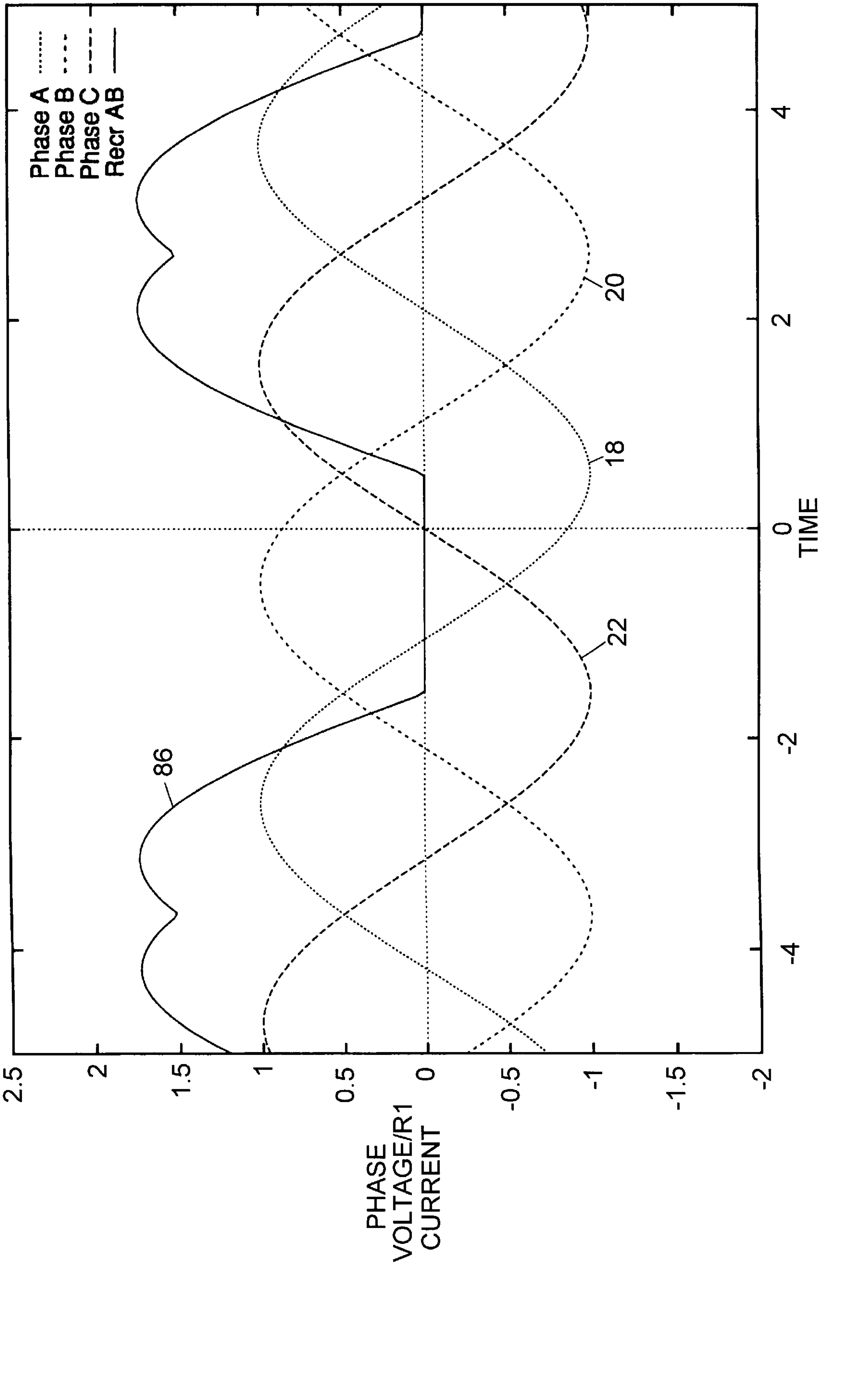
FIG. 5 is a voltage-phase diagram of a control voltage as seen by a receiver with two transmitters active.
Figure 6:
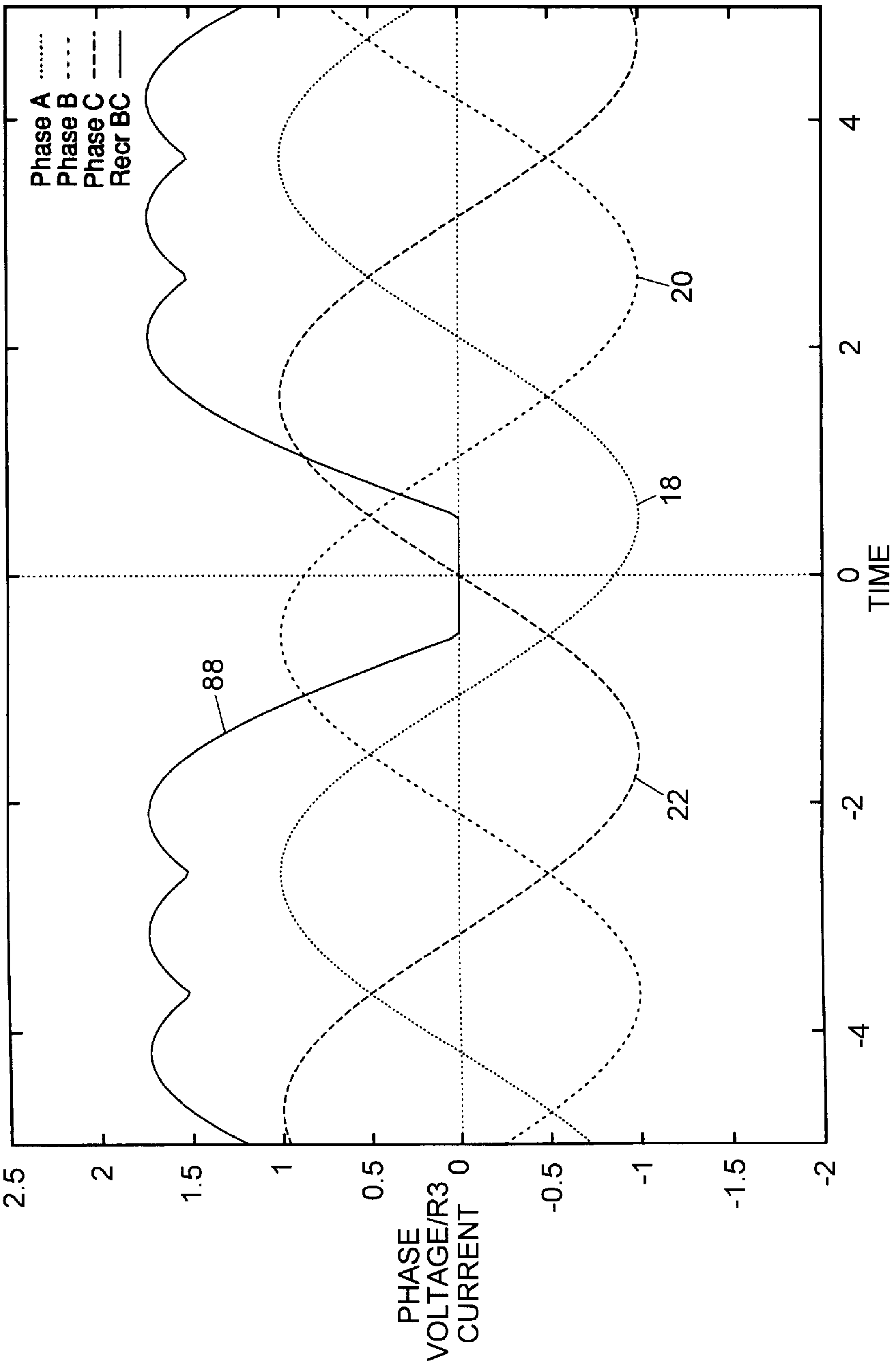
FIG. 6 is a voltage-phase diagram of a control voltage as seen by a receiver on a different phase with two transmitters active.

When the transmitter 26 and the second transmitter 52 are both activated (with the switches closed), the resulting waveform 86 as seen by the receiver 36 in the same phase is shown in FIG. 5. FIG. 6 shows the resulting waveform 88 seen by the receiver 62 in a different phase when both of the transmitters 26 and 52 are operating.

The other receivers act in a similar manner, although the voltage wave forms differ. The maximum control voltage on the control line is the maximum phase-to-phase voltage.

The transmitter 26 thus provides a control voltage and activates the relay in any receiver connected to any combination of phases on the circuit. If the switch of the transmitter 52 is also closed, then the control voltage is the more positive of phase A, phase B, phase C or the neutral. The control voltage is thus at least as high as in the previous situation when only one transmitter is activated. Accordingly, all receivers will continue to respond to the combination of transmitters. If only transmitter 52 is on, the control voltage is at the potential of phase C or neutral. Each of the receivers receive at least a half wave voltage control wave form or more.

The receiver includes supporting electronic circuitry which permits the relay to respond to a wide range of coil voltages and to reduce the current drawn through the control wiring. The relay coil represents a relatively low power load.

Figure 7:
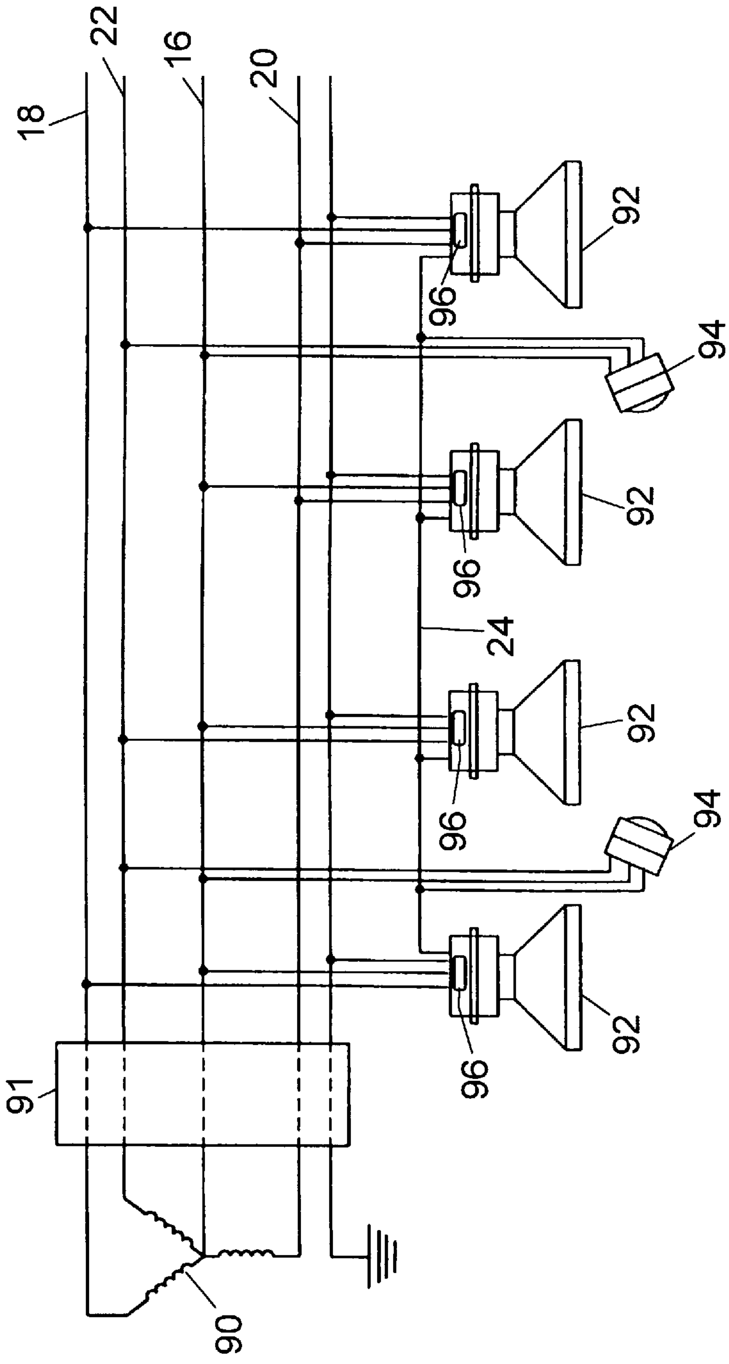
FIG. 7 is a schematic view of a lighting system using the single wire control in a three phase wye connection.

FIG. 7 shows a three phase wye connection with a lighting system, including the three phase power supply 90 having the neutral line 16, and phases A, B and C, 18, 20 and 22, respectively. A panel board 91 is provided. A series of HID (high intensity discharge) lamps 92 is connected to receive the power from the power supply 90. The control line 24 is also connected to each of the lamps 92. The circuit has two transmitters 94 which are connected between the phase C 22 and neutral 16, and thus correspond to the transmitter 52 in FIG. 1. The transmitters 94 also incorporate motion detecting circuitry for detecting movement of people, for example, in the area illuminated by the lamps 92. Each of the lamps 92 is provided with a receiver 96 which receives the signals from the control line 24 as transmitted by the transmitters 94. The receivers 96 effect a dimming of the lamps 92 when no motion is sensed by the motion sensors in the transmitters 94 and conversely effects a brightening of the lamps 92 from the dim mode when motion is sensed. Control of the dimming of the lamps is possible with the single control wire 24.

FIG. 7 represents only one possible configuration of the present light control. The power supply may be a delta configuration instead of the illustrated wye. For the delta configuration, the transmitters 94 are connected between two of the phases A, B and C instead of between a phase and neutral.

The receivers of the present invention may be relays, as described above. The relays are appropriate for the particular line voltage being used. That is, receivers 36, 44 and 62 would contain a relay appropriate for the phase-phase voltage, and receiver 72 would contain a different relay appropriate for the phase-neutral voltage. The transmitters might in their simplest form be a manually activated switch. A simplified version of the transmitter would have only a single diode (either one). For cost and reliability reasons, one diode per transmitter and two per receiver is preferred.

Figure 8:
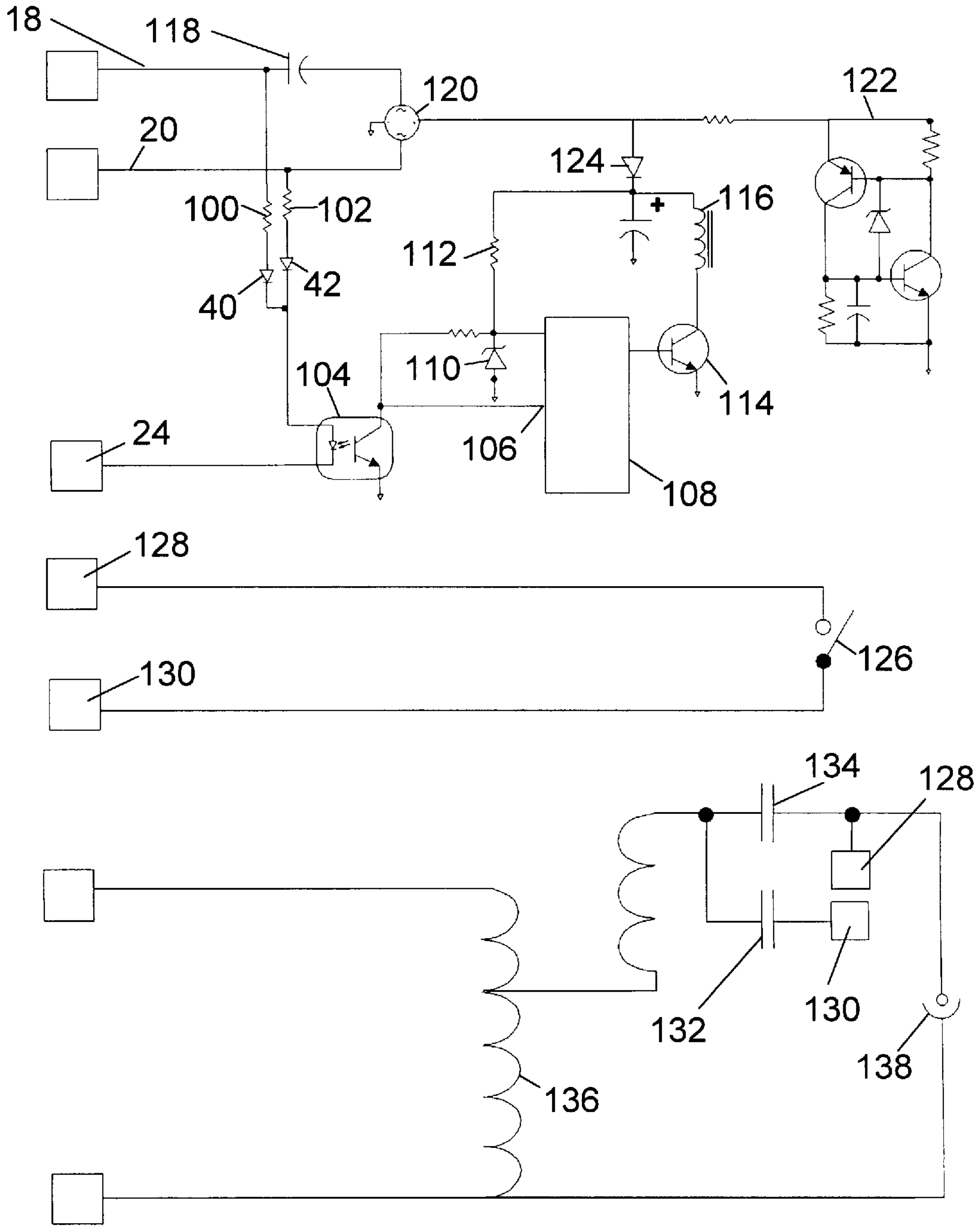
FIG. 8 is a simplified circuit diagram of a receiver according to the present invention.

Although the circuitry may be quite simple, a more complex receiver circuit is preferred. FIG. 8 a simplified model of a preferred receiver circuit using the present invention. The receiver circuit is connected across the phase A and B 18 and 20 leads as the receiver 36 in FIG. 1. The control line 24 and the diodes 40 and 42 are shown. In series with the diodes 40 and 42 are current limiting resistors 100 and 102. An opto-coupler 104 is in the control line 24 in place of the relay coil discussed above. The opto-coupler 104 drives an input 106 of a CPU 108 by pulling the voltage at the input low when the transistor portion of the opto-coupler 104 conducts. A power supply for the CPU 108 includes a zener diode 110 and a resistor 112 for voltage control to set operating voltage of, for example, 5 volts for the processor 108. In one embodiment, the processor is a PIC16C54 processor. The CPU 108 operates under the control of a program to sense a low voltage at the input 106 and output a drive signal to a driver transistor 114. When triggered to operating mode, the driver transistor 114 draws current through a coil 116 of a relay, causing the relay to operate.

The circuit also includes a current limiter capacitor 118 leading to a bridge 120, the output of which is fed to a current shunt circuit 122. The current shunt 122 is shown in U.S. Pat. No. 5,227,762, which is incorporated herein by reference, and operates to temporarily shunt current from the bridge when the voltage reaches a predetermined level so that the voltage is held below this maximum voltage. Current for the coil 116 is drawn through an isolator diode 124.

The relay coil 116 operates a relay contact 126, shown in the circuit portion midway down the page. The relay contact 126, when closed connect, or shorts, a contact pair 128 and 130.

The contact pair 128 and 130 are also shown in the circuit portion at the bottom of FIG. 8, wherein closure of the contacts by operation of the relay switch 126 results in a ballast capacitor 132 being connected in parallel with a main ballast capacitor 134. The ballast capacitors 132 and 134, together with a ballast transformer 136, are connected in series with a lamp 138, which is a high intensity discharge lamp. By switching in and out the capacitor 132, the capacitance of the ballast circuit for the lamp 138 is changed, which results in variation of the brightness of the light emitted by the lamp 138. Dimming is achieved.

Figure 9:
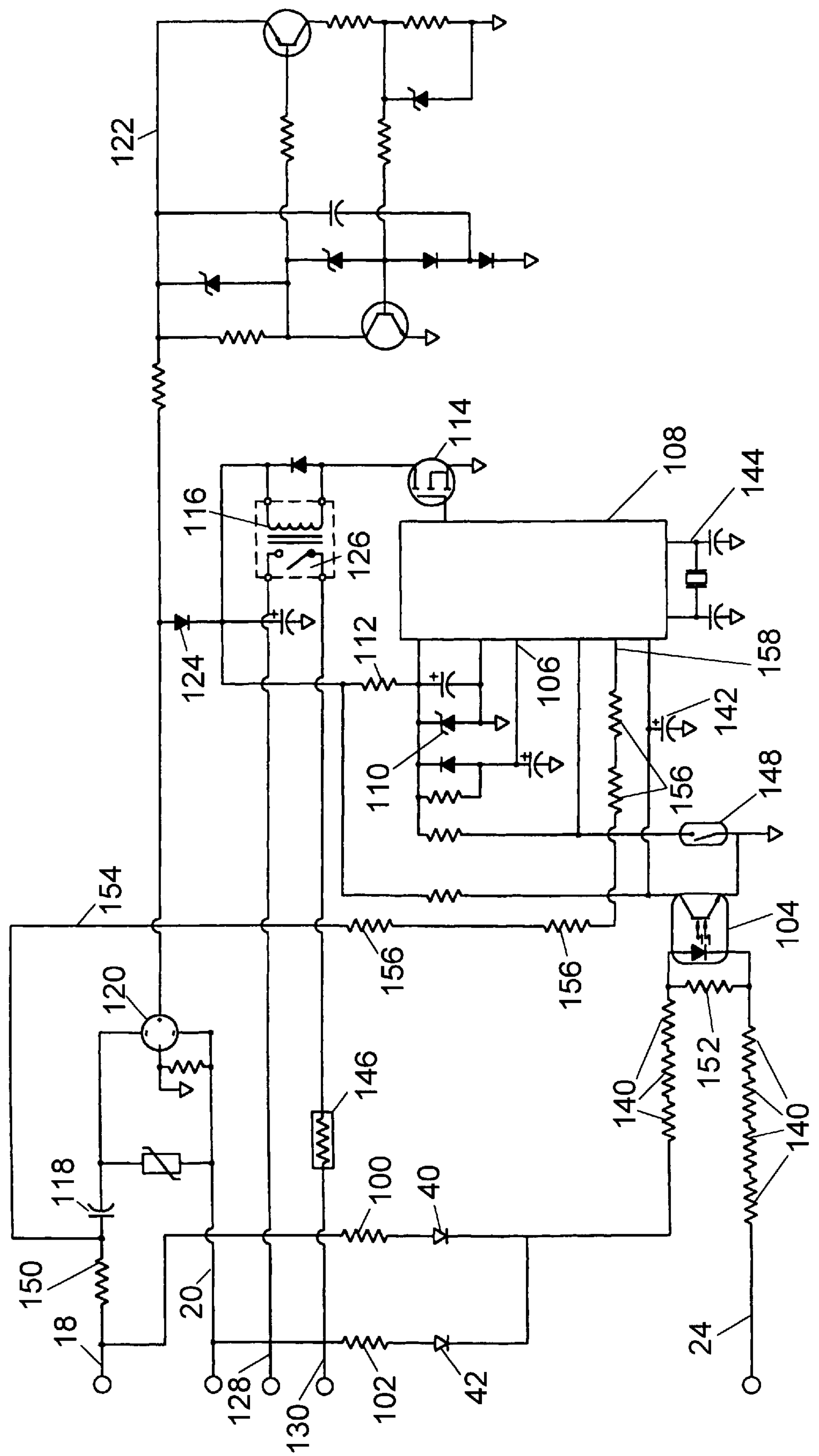
FIG. 9 is a detailed circuit diagram of the receiver circuit shown in FIG. 8.

The simplified circuit of FIG. 8 is disclosed in greater detail in FIG. 9, wherein the control line 24 has additional current limiting resistors 140. Multiple resistors 140 are provided for cost purposes. A single resistor may be used instead, as desired. The output of the opto-coupler 104 has an integrator capacitor 142. An oscillator 144 is provided for the CPU 108 as a clock signal. The relay switch 126 is connected in series with an NTC current limiter 146. As an additional feature, a reed switch 148 is provided in parallel with the transistor side of the opto-coupler 104 for manual operation of the dimming circuit. The reed switch 148 may be manually triggered by movement of a magnet over it. This pulls the voltage at the input 106 low to trigger the dimming operation.

Additional circuit elements are provided as well in the detailed circuit for proper operation of the receiver. For example, a fuse 150 is provided which will open in the event of a catastrophic failure drawing high current. A resistor 152 provided across the LED portion of the opto-coupler 104 may be eliminated from the circuit. Line voltage sensing is provided by a branch 154 having a plurality of resistors 156 with a resulting high impedance at 60 Hz., which resistors 156 may be replaced by a single resistor if desired. An input 158 of the CPU 108 monitors the line voltage. If the line voltage drops for a pre-determined period of time, then the program in the CPU 108 is reset.

Figure 10:
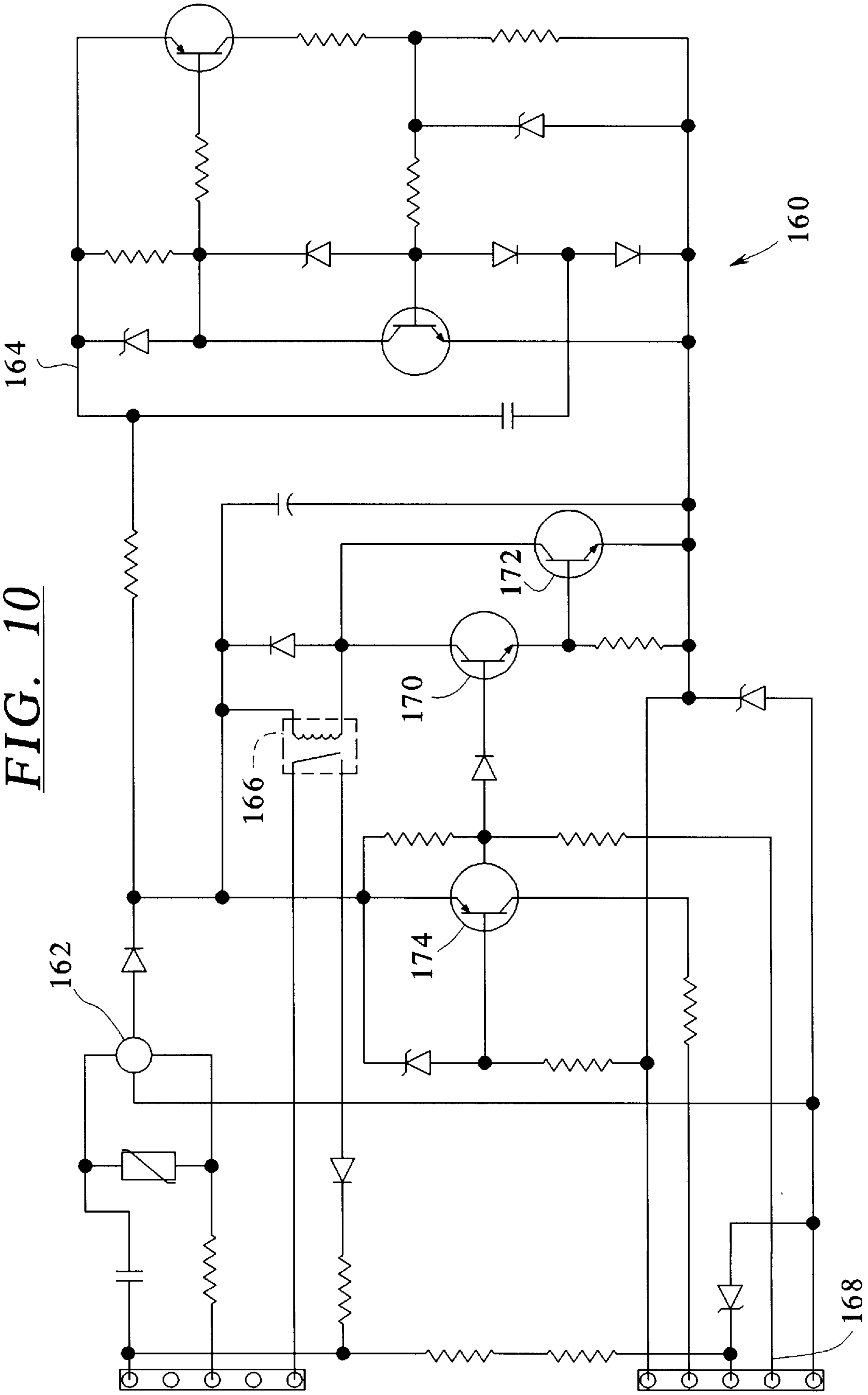
FIG. 10 is a simplified circuit diagram of a diode arrangement for the present invention.

FIG. 10 shows a receiver circuit 160 for the single wire control of the present invention. The power supply including a bridge 162 and current shunt 164 is similar to the receiver circuit described above. A relay 166 is activated by an input to the relay pin 168 of a connector, such as a molex connector. This input would come from the motion detector board (not shown here). A darlington transistor pair 170 and 172 drive the relay coil 166. A transistor 174 is part of the power supply for the relay 166, and is, in effect a power zener in conjunction with a diode.

Figure 11:
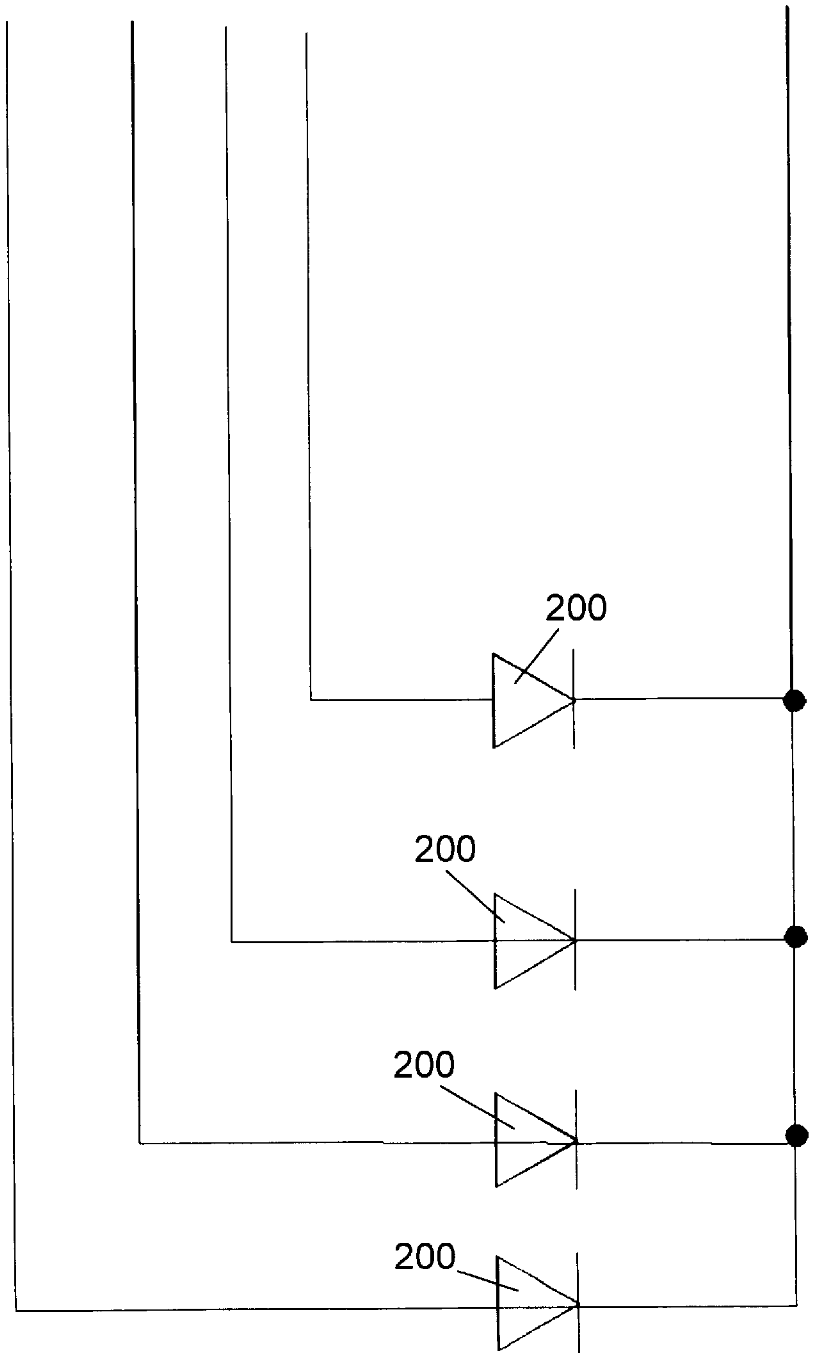
FIG. 11 is a detailed circuit diagram of a further circuit according to the present invention.

FIG. 11 is a schematic of the module used in a manual switch for operating the dimming control. This has all the functionality of the motion detector of FIG. 10, except that it is switched by a manual switch or remote relay, rather than motion. It is merely a set of diodes 200 in series between the line and control line. Four diodes are in a package for convenience and customer value, but each of the four are independent.

It is within the scope of the present invention to utilize a single control wire in a multi-phase power system for activating a remote switch. In the illustrated example, the switch controls lighting. However, other applications of this single control wire are envisioned.

Thus, there is shown and described a lighting dimming control for a three phase powered lighting system in which control of the dimming function is accomplished over a single wire. The single wire has a transmitter which supplies the control signal upon the occurrence of a predetermined condition, such as detection of motion, manual operation of a switch, or triggering of a timer. The control signal is a rectified portion of the three phase power signal. A receiver is provided for each light in the lighting system, the receivers being connected to the single control wire to receive the control signal. The receivers include circuitry to switch in or our a second ballast capacitor to change the ballast capacitance of the light, and thereby effect dimming and brightening.

Although other modifications and changes may be suggested by those skilled in the art, it is the intention of the inventors to embody within the patent warranted hereon all changes and modifications as reasonably and properly come within the scope of their contribution to the art.

We claim:

1. A high intensity discharge light dimming apparatus for a high intensity discharge light system, comprising:

a multi-phase power supply system;

a transmitter connected between two phases of said multi-phase power supply system or between one phase of said multi-phase power supply system and neutral, said transmitter responding to a predetermined condition by generating a control signal;

a receiver connected between two phases of said multi-phase power supply system or between one phase of said multi-phase power supply system and neutral, said receiver including a switch connected to effect a dimming of a light of said high intensity discharge light system upon receipt of said control signal; and a single control wire connected between said transmitter and said receiver to carry a control signal upon occurrence of said predetermined condition.

2. A high intensity discharge light dimming apparatus as claimed in claim 1, wherein said multi-phase power supply system is a delta power supply system.

3. A high intensity discharge light dimming apparatus as claimed in claim 1, wherein said multi-phase power supply system is a wye power supply system.

4. A high intensity discharge light dimming apparatus as claimed in claim 1, wherein said transmitter includes a pair of diodes connected back to back in said connection between two phases of said multi-phase power supply system or between one phase of said multi-phase power supply system and neutral.

5. A high intensity discharge light dimming apparatus as claimed in claim 1, wherein said receiver includes a pair of diodes connected back to back in said connection between two phases of said multi-phase power supply system or between one phase of said multi-phase power supply system and neutral.

6. A high intensity discharge light dimming apparatus as claimed in claim 1, wherein said switch in said receiver includes a relay.

7. A high intensity discharge light dimming apparatus as claimed in claim 1, wherein said transmitter includes a motion sensor and said predetermined condition is movement in a sensing field of said motion sensor.

8. A high intensity discharge light dimming apparatus as claimed in claim 1, wherein said transmitter includes a timer and said predetermined condition is an elapsed time.

9. A high intensity discharge light dimming apparatus as claimed in claim 1, wherein said transmitter includes a manual switch and said predetermined condition is operation of said manual switch.

10. A dimming control for a high intensity discharge lamp arrangement powered by a three phase power system, comprising:

a first branch between a first phase and a second phase of the three phase power system;

a transmitter connected in said first branch, said transmitter including:

at least one transmitter diode connected in said first branch in a first polarity direction;

a switch having a first end connected to said branch;

a control line connected to a second end of said switch;

a second branch between the first phase and the second phase;

a receiver connected in said second branch, said receiver including:

at least one receiver diode connected in said second branch in a polarity opposite said first polarity;

a relay coil connected for operation by signals between said second branch and said control line so that closing of said switch in said transmitter results in control signal being sent over said control line to said receiver to effect control of said lighting system.

* * * * *